Aug. 11, 1970  J. R. HARRIS, JR  3,524,078

POWER CONTROL CIRCUITS

Filed July 7, 1967  2 Sheets-Sheet 1

INVENTOR
JOHN R. HARRIS JR.

BY

ATTORNEY

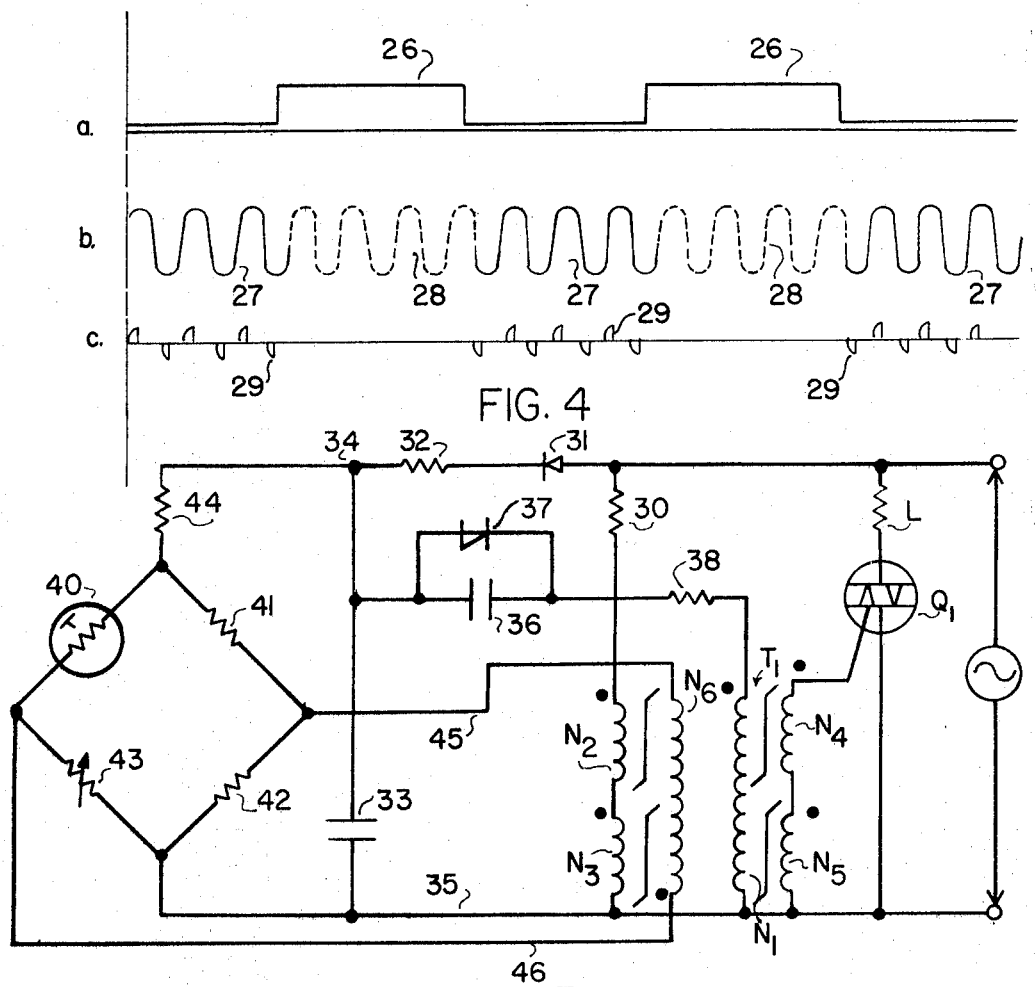
FIG. 4
FIG. 5
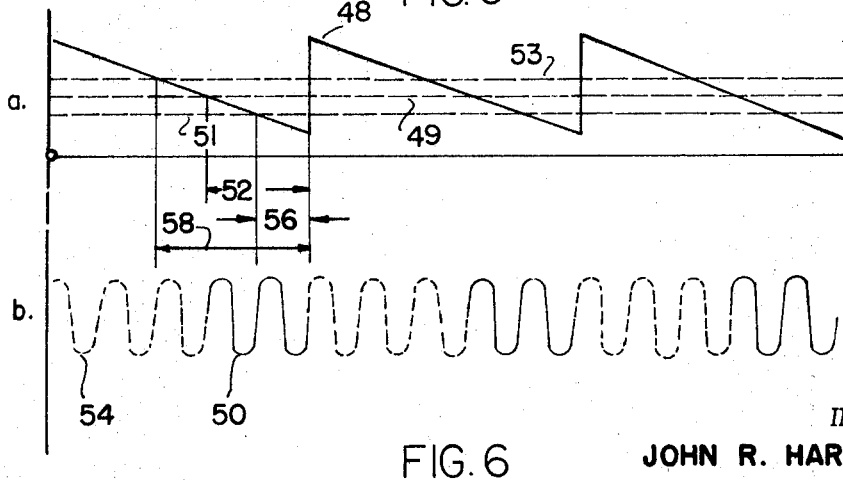
FIG. 6
INVENTOR
JOHN R. HARRIS JR.
BY *[signature]*
ATTORNEY United States Patent Office 3,524,078
Patented Aug. 11, 1970

3,524,078
POWER CONTROL CIRCUITS
John R. Harris, Jr., Irving, Tex., assignor to Hunt Electronics Corporation, Dallas, Tex., a corporation of Texas
Filed July 7, 1967, Ser. No. 651,803
Int. Cl. H03k 17/56, 17/72
U.S. Cl. 307—252     21 Claims

ABSTRACT OF THE DISCLOSURE

There is disclosed as the preferred embodiment of the present invention a magnetic device in combination with a thyristor type device having a gate electrode to which a signal is applied for switching the device from a normally high impedance state to a low impedance state. The magnetic device is one having a primary winding, a secondary winding and a control winding arranged on a core such that the flow of current in either the primary or secondary winding will not induce a current in the control winding. The secondary winding is connected to the gate electrode of the thyristor device. When the core is not saturated and an input signal is applied to the primary winding, a control signal is applied to the thyristor type device causing it to switch from the high impedance state to a low impedance state. The control winding is adapted for connection to a source unidirectional current for selectively producing pre-saturation of the core to prevent the flow of current in the primary winding inducing a control signal in the secondary winding. Static switching is obtained as current will flow only when current is not applied to the control winding. Control of power applied to a load can be obtained by controlling the number of cycles of current applied to the load.

BACKGROUND OF THE INVENTION

Thyristor type devices such as the silicon controlled rectifier have found substantial utility in static switching. In such applications, the thyristor device is used to open or close the circuit completely in a manner similar to that performed nonstatically by various mechanical and electro-mechanical switches. Use of semiconductor devices in such applications is advantageous in that the contact sticking, balance and wear associated with conventionl electro-mechanical relays or contactors is eliminated. Also, since the thyristor device returns to its normal high impedance state at the end of each half cycle, there is very little time lag when it is desired to change the static contactor from the conductive non-conductive state. In thyristor circuits for power control, it has been common to place a suitable control device, such as a light dependent resistor, a magnetic core, or magnetic read switch, in the gate circuit of the thyristor. When the control device is closed, gate current will flow very early in each half cycle of applied alternating current voltage, causing the device to switch to the low impedance state. On the other hand, when the control device is open, gate current cannot flow and the thyristor will not switch to the low impedance state, preventing the flow of load current. Also, various types of oscillators having an output of a frequency much greater than that of the AC supply voltage have been utilized for controlling thyristors utilized as static contactors. Thus, the oscillator is enabled whenever it is desired that the contactor pass load current and the oscillator is disabled whenever load current is to be blocked.

There has also been developed a bidirectional triode thyristor which exhibits characteristics similar to that of two oppositely poled, parallel connected silicon controlled rectifiers controlled by a single gate. The circuitry of the present invention is especially adapted for use of such a device, but can be used with other thyristor type devices.

Thyristor type devices have also been widely used for controlling the effective power applied to a load from an alternating current source by varying the phase relationship between the beginning of a half cycle of alternating current supply and the time at which the thyristor device begins to conduct. Such phase control of AC power is used extensively in many types of control systems, such as motor controls and the control of heating or lighting.

The present invention provides an improved circuit for the control of current or voltage applied to a load from an AC or periodic supply using a solid state switching device such as a bidirectional triode thyristor or the like. The circuitry of the present invention is simple and provides synchronous operation or conduction for integral half cycles of an AC supply. Control of the effective current through a load from an AC supply can be obtained by using the principles of the present invention without generating high frequency electrical noise such as is produced by turning on a solid state switch for variable portions of half cycles of the supply.

In accordance with the principles of the present invention, a thyristor is connected in series with the load and a source of alternating current supply voltage. There is utilized in the gating circuitry for the thyristor a magnetic device preferably one having two magnetic paths. A control winding is wound such that both of the magnetic paths pass through the coil of the control winding. One primary winding and one secondary winding are wound on one of the magnetic paths and a second primary winding and a second secondary winding are wound such that the second magnetic path passes through these two coils. The two primary windings are then connected in series and the two secondary windings are connected in series. Utilizing such a construction, the primary and secondary windings function as a conventional transformer when the core is not saturated. Since the two primary windings have an equal number of turns and the two secondary windings have an equal number of turns, the flux passing through the control winding is cancelled, resulting in zero EMF being induced in the control winding as a result of the flow of current in the primary and secondary windings. When a direct current is passed through the control winding, the two magnetic paths will become pre-saturated, preventing the flow of current in the primary windings including a voltage in the secondary winding.

The secondary winding is connected to apply gate current to the thyristor device when the core is not saturated and current flows in the primary winding. It is therefore possible to utilize the switching device as a static contactor which is responsive to the presence of a direct current signal. Thus, when the direct current signal is present, the core will be pre-saturated and a gate signal will not be applied to cause the thyristor to turn on or switch to the low impedance state. On the other hand, in the absence of sufficient direct current to produce pre-saturation of the core, gate curernt will be applied to the gate of the device at the beginning of each half cycle of applied alternating current supply voltage, resulting in substantially full current flowing through the load for each half cycle.

In accordance with a particular embodiment of the invention, the control winding of the transformer or magnetic amplifier is driven by a multivibrator whose duty cycle is variable. During the presence of a pulse from the multivibrator, sufficient direct current will flow in the control winding to produce pre-saturation of the core, resulting in the thyristor device being maintained in its off or high impedance state for those half cycles of applied AC supply voltage which occurs during the existence of the pulse. On the other hand, if the pulse is not present, gate current will flow at the beginning of each half cycle, permitting load current to flow. The effective power applied to a load is thereby controlled by varying the ratio of conductive half cycles to non-conductive half cycles. It is to be noted that the high frequency noise interference characteristic of conventional phase control apparatus is not present as virtually complete half cycles of current are applied to the load, rendering it unnecessary to provide extensive filtering.

In accordance with another embodiment of the invention, there is provided a power control arrangement utilizing a condition responsive element, such as a photocell or a thermistor, in a bridge circuit for generating a control current, and wherein there is generated a ramp voltage as a reference control current, both of such control currents being applied to control windings on the saturable core to determine the half cycles in which load current is permitted to flow through the solid state switching device.

DESCRIPTION OF THE DRAWINGS

Many objects and advantages of the invention will become readily apparent to those skilled in the art from the following detailed description of preferred embodiments, when taken in conjunction with the accompanying drawings wherein like reference numerals denote like parts and in which:

FIGS. 4a–4c are graphic representations of electrical wave forms appearing in the circuit of FIG. 3 and illustrating the manner in which control of the effective power applied to a load is obtained utilizing such circuit;

FIG. 5 is a schematic diagram of a control circuit in accordance with the principles of the present invention wherein the effective power applied to a load is varied by a condition responsive element; and FIGS. 6a and 6b are graphic representations of electrical wave forms illustrating the operation of the control circuitry of FIG. 5.

Turning now to FIG. 1 of the drawings, there is shown a load L connected in series with a source of alternating current supply voltage by a device $Q_1$. The device $Q_1$ is preferably a bidirectional triode thyristor which normally exhibits a high impedance to the flow of current in either direction but which can be switched to a low impedance state to permit the flow of current in either direction when a control signal is applied to its gate electrode. Such a device is disclosed in much greater detail in an article entitled, "Bidirectional Triode PNPN Switches" by F. E. Gentry, R. I. Scase and J. K. Flowers, published in volume 53, page 355 of the April 1965 issue of the Proceedings of the IEEE.

There is also provided a magnetic device $T_1$ having a primary comprising windings $N_2$ and $N_3$ connected in series and a secondary comprising windings $N_4$ and $N_5$, also connected in series. The secondary is connected between the gate electrode and the anode or cathode of the device $Q_1$. The primary is connected by terminals 5 and 6 to a source of input signals through a current limiting resistor $R_1$, this source suitably being the same as the AC supply for the power side of the circuit with perhaps a step down transformer. There is also provided a control winding $N_1$ adapted to be connected by terminals 7 and 8 to a DC signal source. Capacitor $C_1$ is connected in shunt with winding $N_1$ to compensate for any spurious signals generated due to unbalance of the primary or secondary windings.

Figure 2:
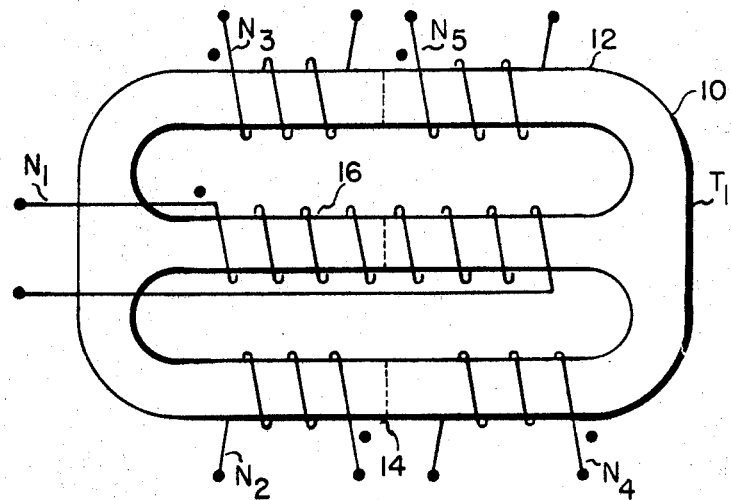
FIG. 2 is a schematic illustration of a preferred type of saturable magnetic device in accordance with the principles of the present invention.

The construction of a preferred magnetic device $T_1$ is shown in greater detail in FIG. 2 of the drawings. Magnetic device $T_1$ includes a core 10 which is suitably formed of a material having a substantially square hysteresis loop. In the specific example shown, the core 10 may be of ferrite material and includes two halves of an E type core defining two outer legs 12 and 14 and a center leg 16. One magnetic path comprises an outer leg 12 and the center leg 16 and a second magnetic path comprises outer leg 14 and center leg 16. Windings $N_2$ and $N_4$ are wound on the outer leg 14 and winding $N_3$ and $N_5$ are wound on outer leg 12. Windings $N_2$ and $N_3$ each have the same number of turns, and also windings $N_4$ and $N_5$ each have the same number of turns. Windings $N_2$ and $N_3$ are wound with the polarity shown and connected in series adding relationship such that flux produced by the flow of current in winding $N_2$ will be added to flux produced by the flow of current in winding $N_3$ in the outer legs 12 and 14 of the core 10. However, the resultant flux induced in the center leg 26 will be zero and current will not be induced in winding $N_1$ as a result of the flow of current in the primary comprising $N_2$ and $N_3$. Similarly, windings $N_4$ and $N_5$ are connected in series adding relationship such that current flowing in the secondary comprising windings $N_4$ and $N_5$ results in the addition of flux in the outer legs 22 and 24 but the net flux produced in inner leg 26 will be zero as a result of cancellation.

When current flows in winding $N_1$, flux will be produced in the three legs 22, 24 and 26 of the core 20. However, the resultant EMF generated in the primary windings $N_2$ and $N_3$ will be zero since EMF generated in winding $N_2$ will be equal in magnitude but of opposite polarity of the EMF generated in winding $N_3$. Similarly, the flow of current in winding $N_1$ will not result in output voltage being produced in the secondary windings $N_4$ and $N_5$ since the EMF generated in the winding $N_4$ will be equal in magnitude and opposite polarity to the EMF generated in winding $N_5$ as a result of change in current in winding $N_1$.

It will be noted further that if the current flowing in winding $N_1$ is of sufficient magnitude, the core 20 will become saturated, in which case a change in current flowing in the primary comprising windings $N_2$ and $N_3$ will not induce a voltage of substantial amplitude in the secondary comprising windings $N_4$ and $N_5$. The number of turns on the winding $N_1$ will ordinarily be much greater than that on the windings $N_2$ and $N_3$ so that the core may be driven into saturation with relatively small currents in this winding compared to the AC signals coupled through the magnetic device to the gate of the device $Q_1$.

It can therefore be seen that when a control signal is applied to terminals 5 and 6 an output signal will be produced across the secondary winding comprising windings $N_4$ and $N_5$ and applied to the gate electrode of the device $Q_1$ for the purpose of turning on the device $Q_1$. If the control signal applied to the input terminal is synchronized with the source of alternating current supply voltage connected in series with the load L and the power terminals of the device $Q_1$, the device $Q_1$ will be switched from its normally high impedance state to a low impedance state very early in the half-cycle of the applied alternating current supply voltage. Since the device $Q_1$ is switched to its low impedance state very early in the cycle, the load current will be virtually sinusoidal in nature and will not be characterized by a substantial amount of the higher order harmonics of the sinusoidal signal. It will therefore not be necessary to provide filtering of the RF signals formally associated with power control circuits in which phase control is utilized. It will be noted that the resistor $R_1$ is a current limiting resistor which limits the amount of current flowing in the primary windings $N_2$ and $N_3$.

Figure 3:
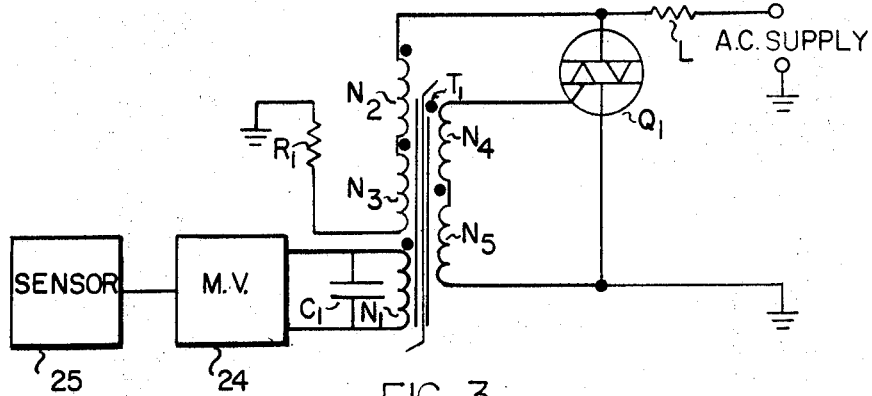
FIG. 3 is a schematic diagram illustrating a circuit for controlling the effective power applied to a load according to another embodiment of the present invention.

If the control signal applied to terminals 5 and 6 is a square wave signal, the maximum potential which will be impressed across the primary winding will be that necessary to cause sufficient current to flow in the secondary winding to produce switching of the device $Q_1$. If, however, the AC signal is applied to the primary, such as one derived from the AC supply line, as shown in FIG. 3 of the drawings, it will have a peak voltage substantially larger than that which must be impressed on the primary to produce switching of the device $Q_1$ very early in the half cycle of the applied AC voltage. Accordingly, if an AC signal is to be used as the control signal, it is desirable to construct the magnetic device such that the core will become saturated when the amplitude of the signal applied to the primary winding becomes on a slightly in excess of that required to induce a signal in the secondary winding sufficient to cause the device $Q_1$ to switch from its normally high to the low impedance state. If the magnetic device is constructed to meet this requirement, pulses will be produced in the secondary winding at the beginning of each half cycle, but once the core of the magnetic device becomes saturated the signal will no longer appear at the terminals of the secondary winding. The possibility of over-driving the device $Q_1$ is therefore minimized or eliminated completely.

Figure 1:
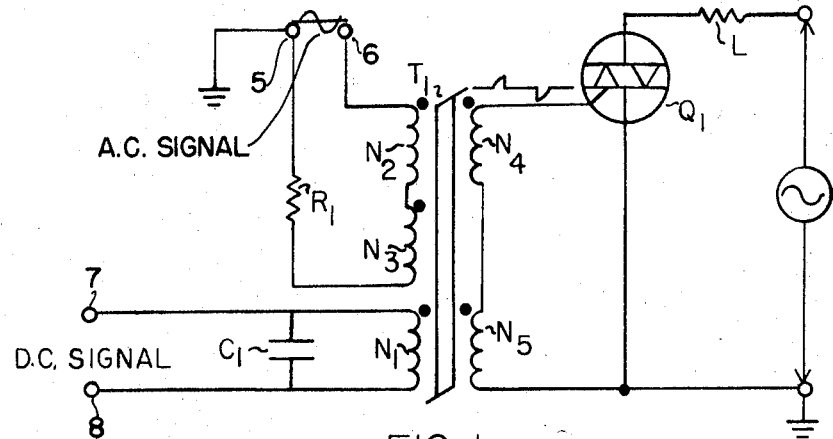
FIG. 1 is a schematic diagram illustrating an embodiment of the invention especially adapted for use as a static contactor.

In operation, the circuit of FIG. 1 will permit conduction of virtually the entire current provided by the AC supply through the load L since the device $Q_1$ will be turned on at almost the beginning at each and every half cycle by signal pulses generated by the magnetic device $T_1$ and coupled to the gate of the device $Q_1$, so long as the core of the magnetic device is not maintained in saturation. The magnetic device $T_1$ will not be in saturation at the beginning of the half cycles so long as a voltage is not applied to the DC signal input, i.e., so long as substantial current does not flow in the control winding $N_1$. Current in the load L may be completely turned off by applying an appropriate voltage to the DC signal input. It will be understood that the current in the load L will be in either a full on or a full off condition, that is either conducting fully for each half cycle of the AC supply or not conducting at all, as distinguished from conducting for a variable portion of each half cycle. It is thus seen that a switch-like control is provided, wherein the control element in the load circuit, the device $Q_1$ does not have the disadvantages of mechanical contacts but yet provides the functional equivalent thereof.

It will also be noted that circuit of FIG. 1 will exhibit synchronous operation in that AC power will be supplied to the load only for entire half cycles of the AC supply. This can be appreciated by considering the conditions which would exist when a DC voltage is applied to the control winding. When the DC voltage is initially applied, the core will become saturated, but the device $Q_1$ will continue to conduct for the remainder of the then existing half cycle since no gate voltage is necessary to sustain it. At the beginning of the next half cycle no trigger pulse will reach the gate, nor will the device $Q_1$ be gated on during succeeding cycles so long as the DC control voltage remains.

In another embodiment of the invention, a multivibrator is used to provide the DC signal input to the winding $N_1$, with a condition-responsive device controlling the multivibrator. With reference to FIG. 3, a control circuit is shown utilizing a device $Q_1$ connected in series with a load L and an AC supply. The gate of the device $Q_1$ is connected to the secondary windings $N_4$ and $N_5$ of magnetic device $T_1$ with the primary windings $N_2$ and $N_3$ of the magnetic device being excited from the AC supply in a series arrangement with a resistor $R_1$. The magnetic device $T_1$ may be constructed as illustrated in FIG. 2, with a control winding $N_1$ on the center leg and a capacitor $C_1$ shunting this control winding. In the circuit of FIG. 3, a multivibrator 24 is used to provide the DC signal to the control winding $N_1$ by connecting the output of the multivibrator across this winding. The multivibrator 24 may be a conventional monostable multivibrator circuit which is duty cycle modulated. The input to the multivibrator is connected to a sensor 25, a device or circuit which produces a DC voltage or resistance level having a magnitude related to some detected quantity such as heat, radiant energy, or the like. For example, this sensor 25 may be thermistor, photoconductive or photovoltaic device connected in a voltage divider or bridge arrangement. The particular form selected for the sensor 25 is not material to the invention, this device merely functioning to produce a condition responsive signal as an input to the multivibrator 24. The multivibrator 24 provides a rectangular voltage output having a given repetition rate which is much lower than the frequency of the AC supply. This repetition rate remains fixed but the length of the rectangular voltage output of the multivibrator varies in response to the output of the sensor 25. The magnitude of the rectangular voltage output of the multivibrator 24 is sufficient to cause a current to flow in the winding $N_1$ that will pre-saturate the core of the magnetic device during the on period in the multivibrator cycle, while during the off period in such cycle the level of the multivibrator output will be essentially zero so that no current will flow in the winding $N_1$ and the transformer core will not be pre-saturated.

The operation of the circuit FIG. 3 may best be understood by reference to the wave forms illustrated in FIG. 4. The output of the multivibrator 24 will be a series of rectangular pulses 26 having a fixed repetition rate as seen in FIG. 4a. The length of these pulses 26 will be determined by the duty cycle of the multivibrator which in turn is controlled by the output of the sensor 25. During the time between the pulses 26 when no voltage appears on the winding $N_1$ triggering pulses 29 as shown in FIG. 4c will be applied to the gate of the device $Q_1$ at the beginning of each half cycle of the AC supply and so the full AC supply will be applied to the load L during the periods 27 as seen in FIG. 4b. During the remaining intervals, or when the pulses 26 appear, the core of the magnetic device $T_1$ will be saturated and no gating pulses 29 will be produced at the secondary windings $N_4$ and $N_5$, as seen in FIG. 4c, thus the device $Q_1$ will be completely cut off and no current will flow in the load L as indicated by the intervals 28 in FIG. 4b. It will be understood that as the length of the pulses 26 increases the periods during which no current flows in the load L will increase and so the effective power supply to the load will decrease as the lengths of the intervals 27 decreases. By an appropriate design of the multivibrator 24, the duty cycle of the lengths of the pulses 26 may be made to vary from zero or virtually zero to a full on condition, corresponding to a full on and a full off condition for current in the load L, respectively. Of course, a full range of proportional control would be provided in the interim in response to the output of the sensor 25. The effective power supplied to the load L may thus be controlled in the circuit of FIG. 3 in response to the condition sensed by the device 25. If, for example, the sensor 25 is a thermistor responsive to ambient temperature and connected in a voltage divider to provide an increasing voltage for increasing temperature, the multivibrator 24 produces a wider pulse width for increasing voltage input, then effective load current will be decreased for increasing temperature. Thus, if the load L is a heater, ambient temperature control is provided.

As discussed above with reference to FIG. 1, the circuit of FIG. 3 will exhibit synchronous operation in that the device $Q_1$ will be turned on at the beginning of a half cycle. Thus, a synchronous switch is provided wherein the effective power supplied to the load is controlled in response to a condition. It will be noted that the power supplied to the load will be in integral numbers of half cycles rather than infinitely variable. This feature will have little effect if the width of the pulses 26 is long compared to the AC supply cycle length, but would be a definite factor if the cycle length of the multivibrator 24 is short, less than about a second.

With reference to FIG. 5, is a schematic diagram of another embodiment of the control circuit of this invention is illustrated. As above, this circuit utilizes a thyristor device $Q_1$ connected in series with a load L across an AC supply line. This circuit is adapted to permit current to flow through the load from the AC supply during entire half cycles when the device $Q_1$ is gated on, or to block all current flow through the load L when the device is off: A magnetic device $T_1$ is used for applying gating pulses to the gate electrode to the device $Q_1$ in a manner similar to that described above in connection with the circuits of FIGS. 1 and 3. The magnetic device $T_1$ is similar to that shown in FIG. 2 in that it includes a pair of primary windings $N_2$ and $N_3$ wound in the same direction on the outer legs of the core. Likewise, the magnetic device $T_1$ includes a pair of secondary windings $N_4$ and $N_5$ wound with the indicated polarities just as in FIG. 2 above. In addition to a control winding $N_1$ wound on the center leg of the core, however, the arrangement of FIG. 5 includes an additional control winding $N_6$ wound on the center leg of the transformer core in opposite direction from that of control winding $N_1$.

AC pulses for turning on the device $Q_1$ are obtained just as in the previous embodiments from the AC supply line by merely connecting the primary windings $N_2$ and $N_3$ across the AC supply, through a resistor 30. AC signals applied to these primary windings $N_2$ and $N_3$ of course will be in phase with the AC supply applied across the load and switching device $Q_1$, and this AC signal will be coupled through the magnetic device so long as its core is not in saturation, thus appearing across the gate and cathode of the device $Q_1$. As before, the core would be driven into saturation by the AC supply voltage on the primary soon after the beginning of each half cycle, but a pulse of a few volts magnitude (similar to those shown in FIG. 4c) gates on the device $Q_1$ at the start of each half cycle, and the load L will conduct full current so long as the transformer core is not pre-saturated by means of the control windings.

Direct current bias for the control windings $N_1$ and $N_6$ is supplied to these windings in opposition from a constant or reference bias arrangement and also from a condition responsive bridge circuit as will now be explained. Connected across the AC supply in FIG. 6 are a diode 31 and a resistor 32 along with a large capacitor 33, these elements functioning to rectify and filter the AC supply and provide a positive reference voltage at a terminal 34. The terminal 34 will remain at a fairly constant DC positive level with respect to the reference line 35 due to the filtering action of the large capacitor 33, the value of this positive voltage being selected by the magnitude of the resistor 32 as well as the other resistances connected in shunt between the terminal 34 and the line 35. From this positive reference voltage there is derived a sawtooth or ramp function for applying to the control winding $N_1$ by means of a capacitor 36 and a threshold type diode 37 shunting the capacitor. In series with these elements is a resistor 38. The diode 37 may comprise a four layer switching diode or the like, the function of this element being to present a fairly high impedance path around the capacitor 36 until the voltage on the capacitor reaches a predetermined level and then to break down and present essentially zero impedance so that the capacitor will discharge through the diode 37. A number of devices are commercially available to provide this function.

Also connected across the source of positive reference potential 34 is a bridge arrangement for applying DC bias to the opposing control winding $N_6$ in the magnetic device $T_1$. This bridge arrangement includes a condition responsive element 40 as one leg of the bridge along with a pair of fixed resistors 41 and 42 and a variable resistor 43. The input to the bridge is connected across the positive reference supply 34 and 35 in series with a resistor 44. The output or remaining terminals of the bridge are connected across the winding $N_6$ by a pair of conductors 45 and 46. It will be noted that with this circuit arrangement no voltage will appear across the conductors 45 and 46, or no current will flow in the bias winding $N_6$ when the bridge is balanced; however, current may be made to flow in either direction through the winding $N_6$ by unbalance of the bridge. The balance or unbalance condition of the bridge is of course determined by the resistance values in the legs of the bridge. Aside from the variable resistor 43, which permits setting of an initial balance or unbalance condition, the primary determining element in the control circuit is the condition responsive device 40 which may take the form of a thermally responsive or light responsive element, or the like.

The operation of the control circuit of FIG. 5 may best be understood by reference to the wave forms graphically illustrated in FIG. 6. The ramp function bias applied to the control winding $N_1$ may be represented as a wave form 48 as illustrated in FIG. 6a. This function is periodic and has a repetition rate which is much slower than the frequency of the AC supply. At the beginning of each cycle of this function 48 the positive voltage appearing across the winding $N_1$ or the current through this winding will be relatively high since the capacitor 36 will be beginning to charge, thus not having a very large voltage thereacross and permitting considerable current to flow therethrough. In this initial condition, the core of the magnetic device $T_1$ will be saturated and no turn-on pulses will be applied to the gate of the device $Q_1$. The level of bias current or voltage for the control winding $N_1$ necessary to saturate the core may be represented by a line 49 in FIG. 6a. As the capacitor 36 charges from the positive reference supply, the voltage across the winding $N_1$ will decay in what is represented in the wave form 48 as virtually a linear function although it is understood of course that this will actually be an exponential. When the voltage across the winding $N_1$ has reached the level 49, the core will no longer be saturated and so triggering pulses will be supplied to the gate of the device $Q_1$ at the beginning of each half cycle of the AC supply, causing the switching element to be virtually fully conductive. In such condition, alternating current will flow in the load as illustrated by the solid portions 50 of the sinusoidal wave form in FIG. 6b for a time 52. The capacitor 36 will continue to charge toward the positive reference voltage appearing between the terminals 34 and the line 35, but will not reach this value because of the action of the diode 37 which has a breakover voltage less than this positive reference voltage. When the breakdown voltage of the diode 37 is reached, the capacitor 36 will immediately discharge through this diode and the bias on the winding $N_1$ will immediately return back to the higher positive level at which the core is saturated and the device $Q_1$ is therefore nonconducting as indicated by the portions 54 of the sinusoidal wave form indicated by dotted lines in FIG. 6b.

The bias level which must be applied to the control winding $N_1$ to saturate the transformer core may be varied in either direction by current through the auxiliary control winding $N_6$, and this will of course be determined by the balance or unbalance condition of the bridge circuit. If the bridge circuit is balanced then the operation of the circuit will be determined entirely by the bias applied to the winding $N_1$, but in the usual mode of operation of the circuit of FIG. 5, the bridge will become unbalanced and will provide a range of proportional control of the period of conduction of the device $Q_1$. For example, the device 40 may be a temperature sensitive resistor which is responsive to the ambient temperature as in a room thermostat. It will be assumed that the device 40 has a negative temperature coefficient of resistance, i.e., that its resistance decreases with increasing temperature. An increase in ambient temperature will thus cause the bridge to become unbalanced in a direction such that the voltage on the line 46 will tend to become positive with respect to that on the line 45, thus current will flow in an upward direction in the control winding $N_6$. Due to the polarities of the windings $N_1$ and $N_6$, the bias will be additive and will tend to raise the total bias on the magnetic device core toward the saturation point. Thus, as will be seen in FIG. 6a, the level 49 representing the saturation level of the core in reference to the wave form 48, will in effect be moved downward to a point such as represented by a level 51. In this case, instead of conducting for a time 52 as shown in FIG. 6b, the device $Q_1$ will be turned on for shorter intervals 56 during each repetition of the waveform 48. In like manner, if the ambient temperature is lower than the desired level, the resistance of the temperature responsive device 40 will increase, thus raising the voltage on the line 45 with respect to that on the line 46 resulting in current flow downward in the winding $N_6$. This would be in opposition to the ramp function bias current provided in the winding $N_1$ and would be in a direction which would tend to drive the core out of saturation so that in effect the point at which the core goes out of saturation during each of the repetitions of the ramp function 48 would be moved to a level 53 as seen in FIG. 6a. This would cause the device $Q_1$ to conduct over intervals 58 as seen in FIG. 6b. In this situation, if the load L represents a heating mechanism, the ambient temperature would thus be raised toward some steady state position.

The range over which proportional control of the interval of conduction during each repetition of the ramp function 48 will depend of course upon the ratio of the number of turns on the winding $N_6$ compared to the winding $N_1$, as well as on the magnitudes of the ramp function 48 and the opposing bias applied across the lines 45 and 46, these magnitudes being determined by the various resistance values selected for the circuit. The range of proportional control may also be made to vary in only one direction, or a given steady state bias current applied to the winding $N_6$, by adjusting the variable resistor 43, or this resistor may be merely used to balance the bridge to a null condition for steady state operation. The element 40 may of course have either a positive or negative temperature coefficient of resistance, with the connections 45 and 46 being reversed for the temperature control example given above if a positive coefficient element is used. Further, it will be appreciated that the variable resistor 43 may be used to place the control circuit in a full on or full off condition if desired. As in the previously described embodiments, the circuit of FIG. 5 will provide synchronous operation.

In place of the bidirectional switch $Q_1$ as shown above, the control circuits of this invention may utilize a unidirectional switching device such as a silicon controlled rectifier, in which case a full wave rectified AC supply may be used.

While the control circuit of this invention has been described with reference to specific embodiments, it is understood of course that this description is not to be construed in a limiting sense. Various modifications of the disclosed embodiments, as well as other embodiments of the invention, will be apparent to those skilled in the art upon reference to this application. It is therefore contemplated that the appended claims will cover any such modification or embodiments as fall within the true scope of this invention.

What is claimed is:

1. A power control circuit comprising a switching device of the type having at least two electrodes with means for connecting said electrodes to a load and a source of periodic electrical current, the switching device normally exhibiting a high impedance between said two electrodes and being switchable to exhibit a low impedance between said two electrodes in response to a control signal applied to said switching device and to remain in such low impedance state so long as current flows through said two electrodes, a magnetic device having a saturable core, means connecting a primary winding on said core to a source of periodic signals having a fixed phase relationship to said periodic electrical current, a secondary winding on said core being coupled to said switching device to provide control signals thereto corresponding to said periodic signals when said core is not maintained in saturation, the core having two distinct magnetic paths with a common leg, the primary winding providing flux equally in both said two paths and the secondary winding being wound equally on both said two paths in such a manner that flux produced by current in either the primary winding or the secondary winding will cancel in said common leg, a control winding on said common leg, and means including a source of periodic electrical pulses having a pulse repetition rate which is much lower than that of said periodic electrical current for selectively applying current to said control winding at a magnitude sufficient to cause saturation of said core, the flux change in said two paths caused by current in said control winding producing cancelling voltages in either said primary winding or said secondary winding whereby current in the control winding will not produce control signals at said switching device.

2. A power control circuit according to claim 1 wherein the source of periodic electrical pulses includes condition-responsive means for varying the width of the pulses whereby the effective electrical power applied to said load varies in response to such condition.

3. A power control circuit according to claim 1 wherein said switching device is a semiconductor device which exhibits said high impedance and low impedance selectively in both directions between said two electrodes and which includes a gate electrode for applying said control signals thereto.

4. A power control circuit according to claim 2 wherein each of such periodic electrical pulses varies in magnitude between a value lower than that which produces saturation of said core and a value higher than that which produces saturation of said core.

5. A power control circuit according to claim 4 wherein flux is induced in said common leg in addition to that produced by said electrical pulses which is selectively either in opposition thereto or additive thereto.

6. A power control circuit according to claim 5 wherein said electrical pulses exhibit a ramp-like waveform.

7. A power control circuit according to claim 5 wherein said additional flux is induced in the common leg by a second control winding on said common leg.

8. A power control circuit according to claim 7 wherein said electrical pulses exhibit a ramp-like waveform and wherein a variable electrical current of either polarity is applied to said second control winding in response to a condition.

9. A power control circuit according to claim 8 wherein said electrical pulses are generated by a circuit including a capacitor connected in series with said control winding and a DC supply, the capacitor being shunted by a device exhibiting high impedance for impressed voltages less than a threshold value which is less than said DC supply and exhibiting low impedance after application of a voltage thereto in excess of said threshold value whereby said capacitor will repetitively change through said control winding and discharge through said device.

10. A power control circuit according to claim 9 wherein an impedance bridge having a condition-responsive impedance element in one leg thereof is connected to said DC supply at two opposite terminals and the remaining two terminals of the bridge are connected to said second control winding to provide said variable electrical current.

11. A power control circuit according to claim 10 wherein source of periodic electrical current is an AC source and where said DC supply is derived from said AC source by means of a rectifier and filter.

12. A power control circuit according to claim 10 wherein said switching device is a semiconductor device which exhibits said high impedance and low impedance selectively in both directions between said two electrodes and which includes a gate electrode for applying said control signals thereto, and wherein said source of periodic electrical current is an AC source.

13. A power control circuit according to claim 12 wherein said means for connecting the primary winding to a source of periodic signals comprises means for coupling said primary winding to said AC source, and wherein said core is driven into saturation by such periodic signal provided from the AC source shortly after the initiation of each half cycle thereof so that the control signals applied to said switching device are of much lower peak magnitude than that of said AC source.

14. A power control circuit comprising a switching device of the type having at least two electrodes with means for connecting said electrodes to a load and a source of AC supply voltage, the switching device normally exhibiting a high impedance between said two electrodes and being switchable to exhibit a low impedance between said two electrodes in response to a control signal applied to said switching device and to remain in such low impedance state so long as current flows through said two electrodes, a magnetic device having a saturable core, means connecting a primary winding on said core to said source of AC supply voltage, a secondary winding on said core being coupled to said switching device to provide control signals thereto corresponding to said periodic signals when said core is not maintained in saturation, the core having two distinct magnetic paths with a common leg, the primary winding being wound equally on both said two paths and the secondary winding being wound equally on both said two paths in such a manner that flux produced by current in either the primary winding or the secondary winding will cancel in said common leg, a control winding on said common leg, and means for selectively applying current to said control winding at a magnitude sufficient to cause saturation of said core, the flux change in said two paths caused by current in said control winding producing cancelling voltages in either said primary winding or said secondary winding whereby current in the control winding will not produce control signals at said switching device, said primary winding having sufficient turns that said core is driven into saturation by signals provided from the AC source shortly after the initiation of each half cycle thereof so that the control signals applied to said switching device do not attain a level sufficient to overdrive said switching device.

15. A power control circuit according to claim 14 wherein said switching device is a semiconductor device which exhibits said high impedance and low impedance selectively in both directions between said two electrodes and which includes a gate electrode for applying said control signals thereto.

16. A power control circuit according to claim 15 wherein the means for selectively applying current to said control winding includes a source of periodic electrical pulses having a given repetition rate which is much lower than that of said AC source.

17. A power control circuit according to claim 16 wherein the number of turns on said control winding is many times greater than on either said primary winding or said secondary winding whereby said electrical pulses may be much lower in magnitude than said AC source.

18. A power control circuit comprising a switching device of the type having at least two electrodes with means for connecting said electrodes to a load and source of periodic electrical current, the switching device normally exhibiting a high impedance between said two electrodes and being switchable to exhibit a low impedance between said two electrodes in response to a control signal applied to said switching device and to remain in such low impedance state so long as current flows through said two electrodes, magnetic device means having a saturable core, means connecting a primary winding on said core to a source of periodic signals having a fixed phase relationship to said source of periodic electrical current, a secondary winding on said core being coupled to said switching device to provide control signals thereto corresponding to said periodic signals when said core is not maintained in saturation, a control winding on said core, means for applying periodic current pulses to said control winding at a magnitude sufficient to cause saturation of said core and at a repetition rate much lower than that of said periodic electrical current, and means for controlling the time interval during which said current pulses are at said magnitude sufficient to cause saturation.

19. A power control circuit according to claim 18 wherein the source of periodic electrical current is an AC source, wherein the means for connecting the primary winding to the source of periodic signals comprises means for coupling said primary winding to said AC source, and wherein said core is driven into saturation by such periodic electrical current provided from the AC source shortly after the initiation of each half cycle thereof so that the control signals applied to said switching device do not attain a level sufficient to overdrive said switching device.

20. A power control circuit according to claim 18 wherein said means for controlling the time interval during which said current pulses are at said magnitude comprises a source of periodic electrical pulses controlled by condition-responsive means for varying the width of the pulses whereby the effective electrical power supplied to said load varies in response to such condition.

21. A power control circuit according to claim 18 wherein each of such current pulses applied to said control winding varies in magnitude in a ramp function from a value higher than that which produces saturation of said core to a value lower than that which produces saturation of the core, wherein a second control winding is provided on said core, and wherein a variable electrical current of either polarity is applied to said second control winding in response to a condition.

References Cited

UNITED STATES PATENTS

| | | | |
|---|---|---|---|
| 2,998,547 | 8/1961 | Berman | 307—252 X |
| 3,346,802 | 10/1967 | Biet | 307—305 X |
| 3,386,026 | 5/1968 | Gutterman | 321—8 |
| 3,388,294 | 6/1968 | Davis | 307—305 X |
| 3,417,320 | 12/1968 | Muskovac | 307—252 X |

JOHN S. HEYMAN, Primary Examiner

S. D. MILLER, Assistant Examiner

U.S. Cl. X.R.

307—284, 305, 314; 323—89